United States Patent

Matsui

(10) Patent No.: US 7,623,431 B2
(45) Date of Patent: Nov. 24, 2009

(54) OPTICAL DISK DRIVE

(75) Inventor: Teruo Matsui, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 464 days.

(21) Appl. No.: 11/730,848

(22) Filed: Apr. 4, 2007

(65) Prior Publication Data

US 2007/0237048 A1    Oct. 11, 2007

(30) Foreign Application Priority Data

Apr. 6, 2006    (JP)    ............... 2006-105266

(51) Int. Cl.
*G11B 20/10*    (2006.01)
(52) U.S. Cl. ................ 369/59.12; 369/53.22
(58) Field of Classification Search ........ None
See application file for complete search history.

(56) References Cited

U.S. PATENT DOCUMENTS

2005/0030860 A1*  2/2005  Gage et al. .......... 369/47.53
2005/0185537 A1*  8/2005  Ninomiya ............ 369/44.33
2006/0221791 A1*  10/2006  Suh et al. ............ 369/53.2
2007/0086300 A1*  4/2007  Pereira ............... 369/59.11

FOREIGN PATENT DOCUMENTS

JP    2005-322312    11/2005

* cited by examiner

*Primary Examiner*—Paul Huber
(74) *Attorney, Agent, or Firm*—Pillsbury Winthrop Shaw Pittman, LLP

(57) ABSTRACT

A read out means reads out, from a multisession type optical disk which has been loaded, identification information which indicates its type, and a recommended write strategy pulse width. A calculation means, when a decision means has decided that the multisession type optical disk is of an unknown type, calculates a compensated pulse width based upon the value of the difference between the average value of the intrinsic write strategy pulse widths which are stored by a strategy storage means in correspondence with the identification information, and the recommended write strategy pulse width which has been read out by the read out means. And a recording means performs recording of data with laser light which has been modulated to the compensated pulse width as calculated by the calculation means.

3 Claims, 3 Drawing Sheets

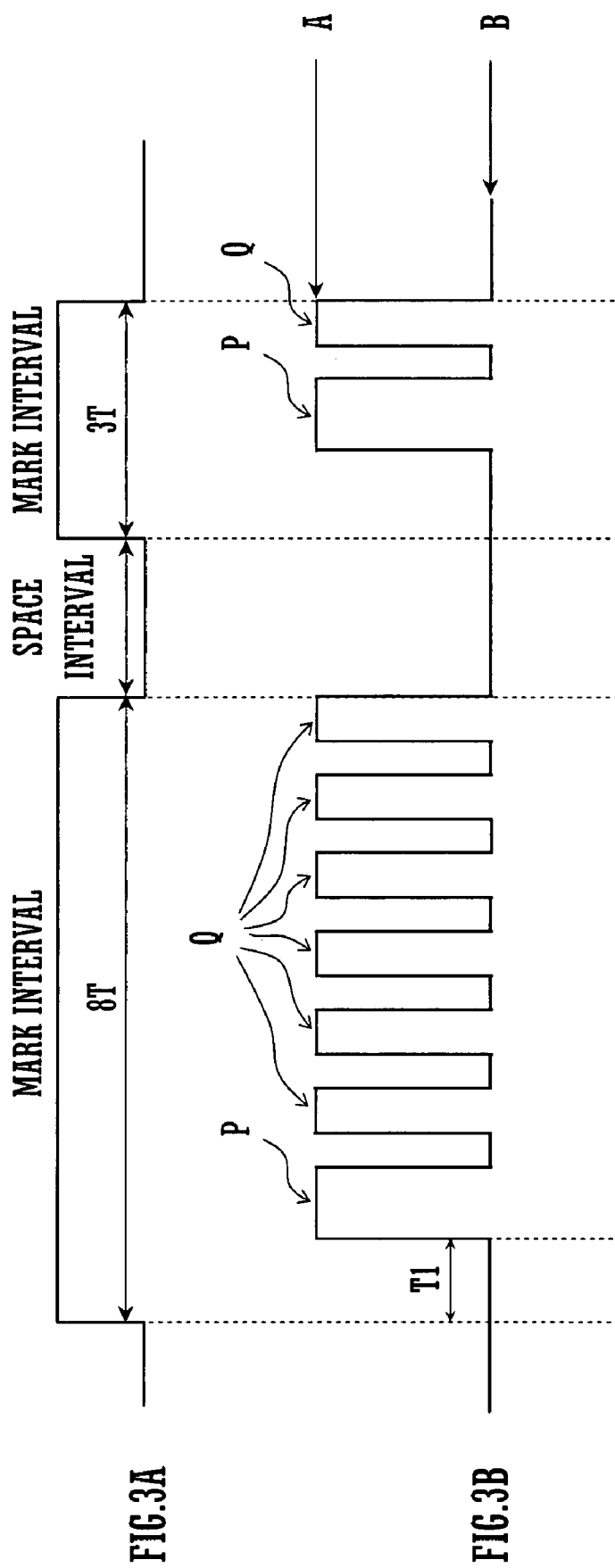

OPTICAL DISK DRIVE

CROSS REFERENCE

This Nonprovisional application claims priority under 35 U.S.C. § 119(a) on Patent Application No. 2006-105266 filed in Japan on Apr. 6, 2006, the entire contents of which are hereby incorporated by reference.

BACKGROUND OF THE INVENTION

The present invention relates to an optical disk device which records data upon a multisession type optical disk such as a DVD+R or a DVD-R or the like There are various optical disk devices which record data upon multisession type optical disks such as DVD+Rs or DVD-Rs or the like (hereinafter simply termed "optical disks"). Such an optical disk device records data upon this optical disk by irradiating onto the optical disk laser light which has been pulse modulated based upon a write strategy. The write strategy according to which the data can be recorded optimally varies according to the characteristics of the optical disk, in other words according to the type of the optical disk. In such a write strategy, there is included information which prescribes the pulse width of the top pulses and the multi pulses by which the data can be recorded optimally, and the like. Due to this, the optical disk device stores a write strategy for each type of optical disk, and performs recording of data with pulse modulated laser light based upon the write strategy which corresponds to the type of optical disk upon which the data is to be recorded.

Furthermore, when recording data upon an optical disk of a type for which no write strategy is stored, the optical disk device performs this data recording with pulse modulated laser light based upon write strategy recommended values, which are recorded upon this optical disk. On the other hand, the write strategy by which data may be optimally recorded does not only depend upon the type of the optical disk, but also varies according to the characteristics of the optical disk device which performs this data recording. In other words, the write strategy by which the data may optimally be recorded is determined both by the type of the optical disk, and by the characteristics of the optical disk device. Because of this, even if the data is recorded with laser light which is pulse modulated based upon the recommended values in the write strategy recorded upon the optical disk, sometimes failure happens during recording of the data.

It should be understood that, in practice, in the present conditions in which optical disks of many different types are already being manufactured and also new types of optical disks continue to appear on the market one after another at a rapid pace, it is not feasible to store write strategies for all the different possible types of optical disk within the optical disk device.

Moreover, an optical disk device which determines a write strategy based upon write strategy recommended values which are recorded upon the optical disk and also upon the characteristics of the optical disk device, and which records data by irradiation with laser light which has been pulse modulated based upon this write strategy which has thus been confirmed, has been described in Japanese Laid-Open Patent Publication 2005-322312.

However, with this structure, each time when recording data upon an optical disk, it is necessary to determine the write strategy for the particular optical disk upon which the data is to be recorded, and the problem arises that the processing burden upon the optical disk device becomes large.

The object of the present invention is to provide an optical disk device, with which recording of data can be performed in an adequate manner upon an optical disk of a type for which no write strategy is stored, and with which, moreover, the processing burden upon the optical disk device is reduced.

SUMMARY OF THE INVENTION

With the present invention, a strategy storage means stores, for each value of identification information which indicates a type of multisession type optical disk, an intrinsic write strategy pulse width in relationship therewith. Furthermore, a read out means reads out, from a multisession type optical disk which has been loaded, identification information which indicates its type, and a recommended write strategy pulse width. And a decision means decides whether the multisession type optical disk whose identification information has been read out by the read out means is a multisession type optical disk of an already known type whose identification information is stored in the strategy storage means, or is a multisession type optical disk of an unknown type whose identification information is not thus stored. Moreover, a calculation means, when the decision means has decided that the multisession type optical disk is of an unknown type, calculates a compensated pulse width based upon the value of the difference between the average value of the intrinsic write strategy pulse widths which are stored by the strategy storage means in correspondence with the identification information, and the recommended write strategy pulse width which has been read out by the read out means. Finally, a recording means, in the case of a multisession type optical disk which has been decided by the decision means to be of an already known type, performs recording of data upon the multisession type optical disk with laser light which has been modulated to the intrinsic pulse width stored by the strategy storage means. Conversely, in the case of a multisession type optical disk which has been decided by the decision means to be of an unknown type, the recording means performs recording of data upon the multisession type optical disk with laser light which has been modulated to the compensated pulse width calculated by the calculation means.

In this manner, if the optical disk upon which data is to be recorded is one of a type for which a write strategy intrinsic pulse width is not stored in the strategy storage means, then the recording is performed with laser light modulated based upon this compensated pulse width which is calculated by the calculation means. Although the intrinsic pulse widths which are stored by the strategy storage means for each type of optical disk are not uniform, they do not vary greatly. Due to this, the average value of the intrinsic pulse widths which are stored for the various types of optical disk by the strategy storage means may be taken advantage of as reference values of pulse width, in consideration of the characteristics of the device. Furthermore, the value of the difference between the recommended pulse width and the average value of the intrinsic pulse widths is the amount of deviation of the recommended pulse width with respect to that reference value. Because of this, the compensated pulse width which is calculated by the calculation means is one which takes into account the characteristics both of the optical disk and of the device itself. Accordingly, the recording of the data is performed in an adequate manner, even in the case of an optical disk of a type for which no write strategy is stored.

Furthermore, if the optical disk upon which data is to be recorded is one of a type for which a write strategy intrinsic pulse width is stored in the storage means, then it is possible to reduce the burden of processing upon the device, since the recording is performed with laser light modulated based upon this intrinsic pulse width which is stored.

It should be understood that, for example, this compensated pulse width may be the sum of the average value and the difference value. Moreover, it would also be acceptable to arrange, in the case of a multisession type optical disk which has been decided by the decision means to be of an unknown type, to take the compensated pulse width which has been calculated by the calculation means as being an intrinsic pulse width, and to store it in the strategy storage means in correspondence with the identification information for this multisession type optical disk which has been read out by the read out means.

BRIEF DESCRIPTION OF THE DRAWINGS

FIG. 3A and FIG. 3B are figures for a multisession type optical disk, showing the relationship between a recording signal and a write pulse signal.

DETAILED DESCRIPTION OF THE INVENTION

Figure 1:
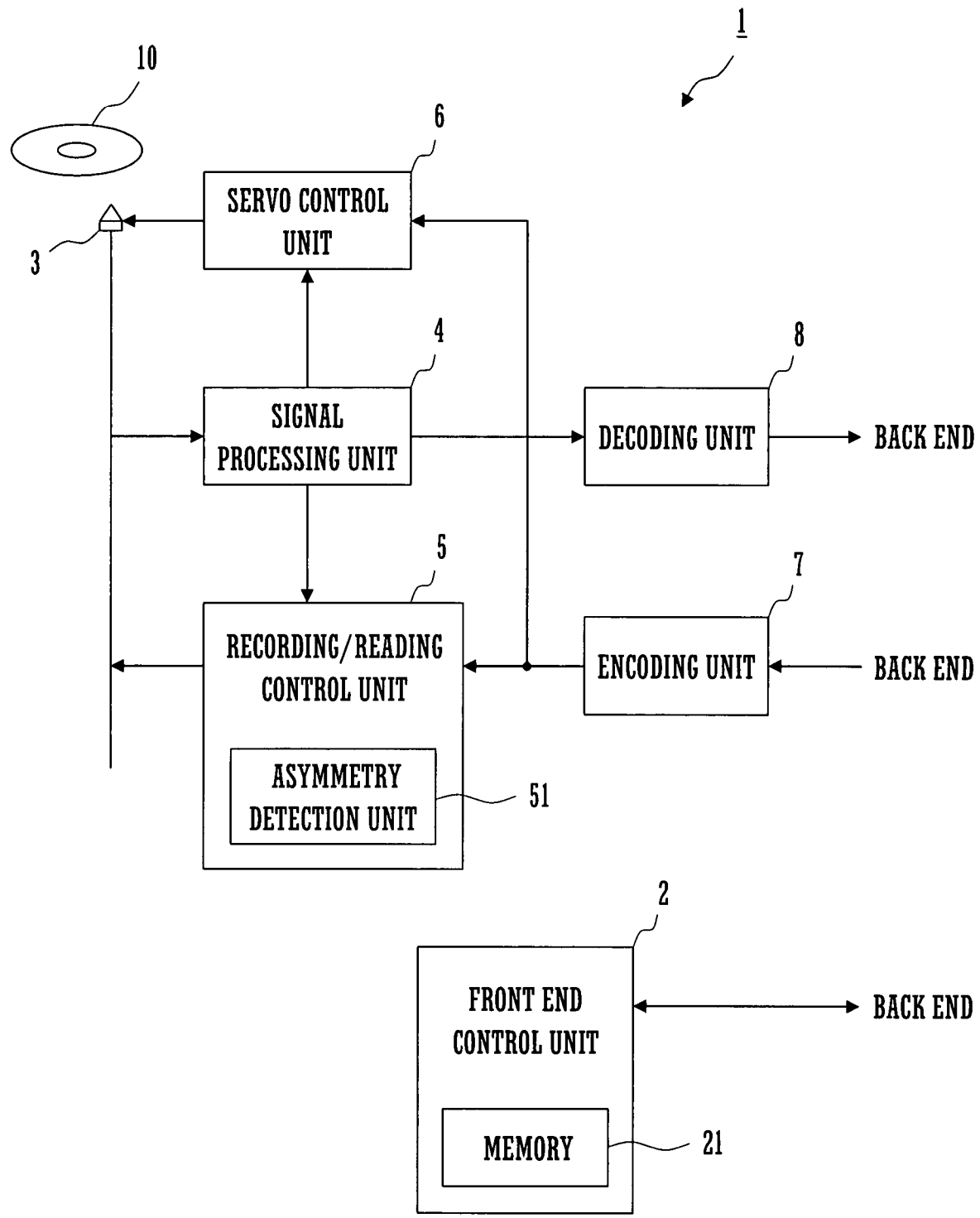
FIG. 1 is a figure showing the structure of the main portion of an optical disk device.

FIG. 1 is a figure showing the structure of the main portion of an optical disk device which is an embodiment of the present invention. The optical disk device 1 of this invention comprises a front end control unit 2, a pickup head 3, a signal processing unit 4, a recording/reading control unit 5, a servo control unit 6, an encoding unit 7, a decoding unit 8, and the like. The front end control unit 2 controls the operation of various portions on the front end of the device, related to recording of data upon the optical disk 10 and reading of data from the optical disk 10. The pickup head 3 comprises a light emitting element (LD) which irradiates light upon the optical disk 10, a light receiving element (PD) which detects light reflected from the optical disk 10, and so on. Furthermore, the pickup head 3 is mounted to the main body of this optical disk device via a thread motor not shown in the figures, and is capable of shifting freely in the radial direction of the optical disk 10. Moreover, an objective lens (also not shown in the figures) is provided to the pickup head 3. This objective lens is supported upon a double axis actuator, and, by being driven by this actuator, can be shifted in the direction towards and away from the optical disk 10 which is loaded into the main body of this optical disk device, and also in the radial direction of the disk.

The signal processing unit 4 processes the output of a light receiving element provided to the pickup head 3, and creates and outputs a focus error (FE) signal, a tracking error (TE) signal, and a data read (RF) signal. The FE signal specifies the amount of deviation between the recording surface of the optical disk 10 and the condensation position of the laser light irradiated from the pickup head 3. The TE signal specifies the amount of deviation between the irradiation position of the laser light irradiated from the pickup head 3 and the center of the track upon the optical disk 10. And the RF signal is a read signal for the data recorded upon the optical disk.

The recording/reading control unit 5 controls the laser light irradiated upon the optical disk 10 during recording of data upon the optical disk 10 and reading of data from the optical disk 10. And the servo control unit 6 performs focus servo control and tracking servo control and so on. In this focus servo control, the shifting of the objective lens of the pickup head 3 in the direction towards and away from the optical disk 10 is controlled based upon the FE signal. And, in this tracking servo control, the shifting of the pickup head 3, or of the objective lens of the pickup head 3, in the radial direction of the optical disk 10 is controlled based upon the TE signal.

The encoding unit 7 encodes the data to be recorded upon the optical disk 10. The data to be recorded upon the optical disk 10 is inputted to this encoding unit 7 from a back end section not shown in the figures. The encoding unit 7 inputs a recording signal (NRZI) based upon the encoded data to the recording/reading control unit 5 and the servo control unit 6. And the decoding unit 8 extracts the data recorded upon the optical disk 10 from an RF signal which has been inputted from the signal processing unit 4, and decodes that data. Furthermore, the decoding unit 8 then sends the decoded data to the back end section.

It should be understood that the structure of the back end section of the optical disk device 1 has been omitted from FIG. 1. This back end section performs processing for receiving input of data to be recorded upon the optical disk 10, processing for outputting data which has been read from the optical disk 10, processing for receiving input actuation to a main device from the user, and the like.

The front end control unit 2 comprises a memory 21. For a plurality of types of optical disk 10, this memory 21 stores, in mutual correspondence, identification information which specifies the type of the optical disk, and the intrinsic pulse width of a write strategy for that optical disk. This identification information may be, for example, a maker's type number which is recorded in advance upon the optical disk, and is recorded in ADIP information which is recorded upon the inner circumferential portion of an OPC region of the optical disk 10, along with the value of a recommended pulse width of a write strategy, as will be described hereinafter. When recording data upon an optical disk 10 which has been loaded, the front end control unit 2 reads out, from the memory 21, the intrinsic pulse width of that write strategy which corresponds to the identification information recorded upon this optical disk.

The recording/reading control unit 5 creates marks upon the optical disk 10 corresponding to the recording signal which has been inputted from the encoding unit 7, by irradiating it with laser light. Furthermore, the recording/reading control unit 5 performs pulse modulation of the laser light irradiated upon the optical disk 10, and controls the power of the laser, according to a write strategy. Moreover, it controls the power of the laser light irradiated upon the optical disk 10 during reading out of data from the optical disk 10.

Furthermore, the recording/reading control unit 5 comprises an asymmetry detection unit 51. While the OPC region of the optical disk 10 is being replayed during OPC execution, this asymmetry detection unit 51 calculates a parameter β (the asymmetry) from the RF signal which is outputted from the signal processing unit 4. Here, if the peak level of the signal waveform (reference symbol "+") is termed a, and its bottom level (reference symbol "−") is termed b, then β may be obtained by β=(a+b)/(a−b). OPC processing is processing for performing trial writing upon the OPC region of the optical disk which is loaded while varying the power of the laser light, and thereby confirming the optimum recording power. The recording/reading control unit 5 acquires the laser power at which the value of β from the RF signal which is outputted during replaying of the region upon which this trial writing has been performed becomes a target value for β, as being the optimum recording power. This target value for β is set to 0.050. This is the value at the center of −0.050~0.150, which are standard values for β.

Figure 2:
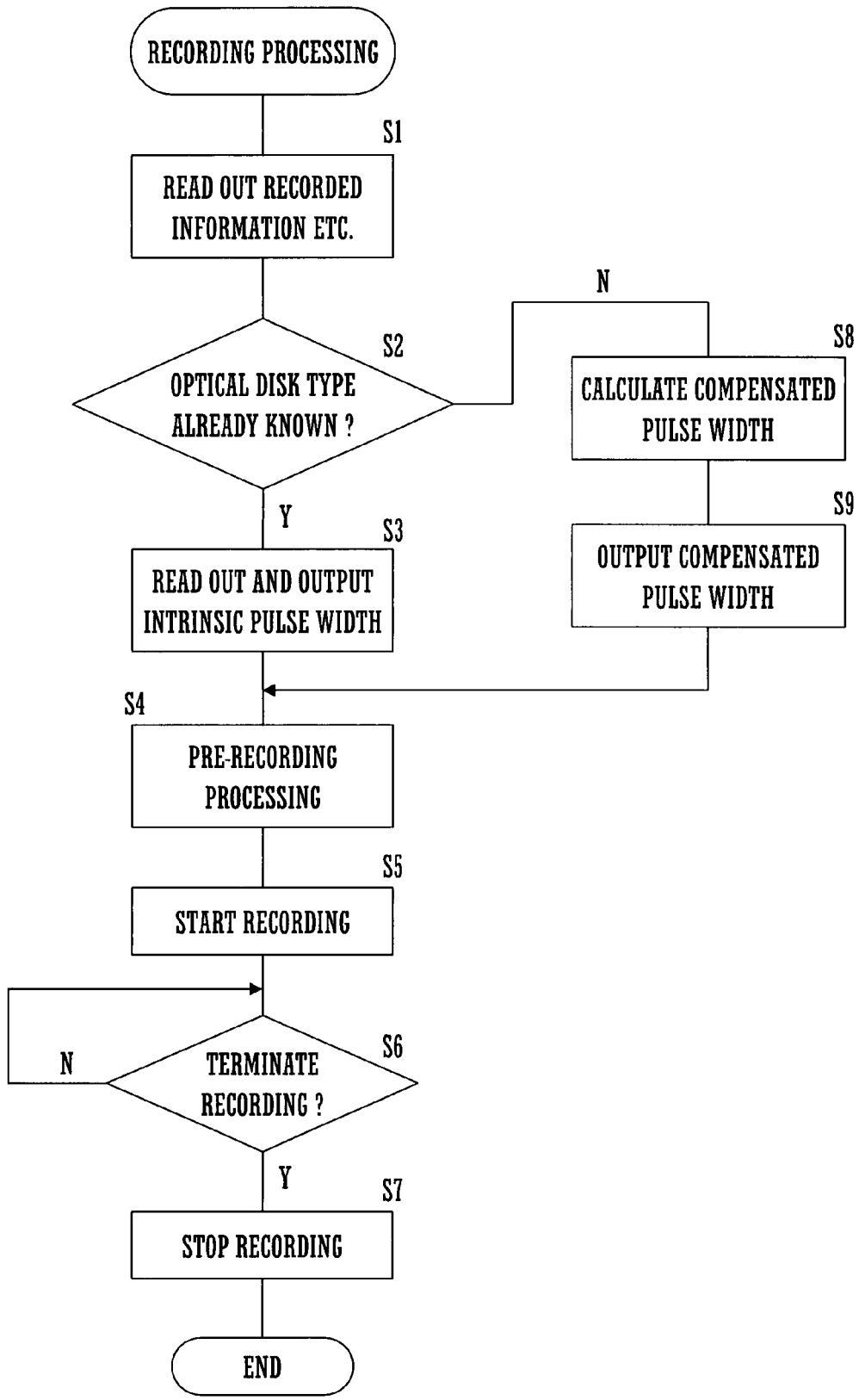
FIG. 2 is a flow chart showing recording processing for recording data upon an optical disk which has been loaded into this optical disk device.

FIG. 2 is a flow chart showing recording processing for recording data upon an optical disk 10. When a command for starting recording data to the optical disk 10 is inputted from the back end section, the front end control unit 2 reads out identification information from the optical disk 10 which is loaded (a step S1). It should be understood that, in this processing of the step S1, along with the identification information, the recommended pulse width of the write strategy is also read out.

Next, the front end control unit 2 decides whether or not the optical disk 10 which is loaded, in other words the optical disk upon which data is to be recorded, is one of an already known type, or is one of an unknown type (a step S2). In concrete terms, if the intrinsic pulse width corresponding to the stored in the memory 21, then the control unit decides that the disk is one of an already known type; while, if this corresponding intrinsic pulse width is not stored in the memory 21, then it decides that the disk is of an unknown type.

If the front end control unit 2 decides in the step S2 that this optical disk 10 is one of an already known type, then it reads out from the memory 21 the intrinsic pulse width which corresponds to this optical disk 10, and outputs it to the recording/reading processing unit 5 and so on as the pulse width for the write strategy (a step S3). On the other hand, if the front end control unit 2 decides in the step S2 that this optical disk 10 is one of an unknown type, then it calculates in the main device an optimum pulse width (a compensated pulse width), using the recommended pulse width of the write strategy which was read out from the optical disk 10 in the step S1 (a step S8). As described above, this recommended pulse width is a recommended value for the pulse width of the write strategy for this optical disk 10.

In the step S8, the average value of the intrinsic pulse widths for all of the write strategies which are stored in the memory 21 (i.e. the intrinsic pulse width average value W) is calculated. Next, the value M of the difference between this intrinsic pulse width average value W and the recommended pulse width N (the recommended pulse width of the write strategy which has been read out from the optical disk 10 in the step S1) is calculated. Furthermore, a compensated pulse width X is calculated by adding together the intrinsic pulse width average value W and this difference value M. In other words, the compensated pulse width X is calculated according to:

compensated pulse width $X$=intrinsic pulse width average value $W$+(intrinsic pulse width average value $W$−recommended pulse width $N$)=2×intrinsic pulse width average value $W$−recommended pulse width $N$ Here, although the intrinsic pulse width which is stored in the memory for each type of optical disk 10 is not uniform, it does not vary greatly. Due to this, the average value of the intrinsic pulse width stored in the memory 21 for each type of optical disk 10 (in other words the intrinsic pulse width average value W) is termed the reference value for pulse width in consideration of the characteristics of the device. Furthermore, the value of the difference between the recommended pulse width N and the intrinsic pulse width average value W is a value which shows to what extent the recommended pulse width N deviates with respect to the intrinsic pulse width average value W. In other words, in the step S8, the compensated pulse width X is calculated by offsetting the reference value of the pulse width in consideration of the characteristics of the device (the intrinsic pulse width average value W) by the amount of deviation between this reference value and the recommended pulse width N. Accordingly, the compensated pulse width which is calculated in this step S8 is a value which takes into consideration the characteristics of the optical disk 10 upon which the data is recorded, and also the characteristics of the optical disk device 1.

The front end control unit 2 outputs this compensated pulse width X which has been calculated in the step S8 to the recording/reading processing unit 5 and so on as a pulse width for its write strategy (a step S9).

Next, the front end control unit 2 performs pre-recording processing (a step S4). In concrete terms, it performs per se known processing such as the OPC described above and so on. After this, the front end control unit 2 starts recording data upon the optical disk 10 (a step S5), and, when it receives a signal from the back end section to terminate recording of data upon the optical disk 10 (a step S6), then it stops recording of data upon the optical disk 10 (a step S7), and terminates processing. And the recording/reading processing unit 5 performs recording of the OPC and data with laser light which has been modulated according to the write strategy inputted from the front end control unit 2 in the step S3 or the step S9.

In this recording of the data upon the optical disk 10, the encoding unit 7 encodes the data which has been sent from the back end section, and inputs a recording signal (NRZI) corresponding to this encoded data to the recording/reading processing unit 5. And, based upon this recording signal which has been inputted, the recording/reading processing unit 5 irradiates upon the optical disk 10 laser light which has been modulated at the pulse width of the write strategy which has been inputted from the front end control unit 2 in the step S3 or the step S9.

As shown in FIG. 3A, the recording signal which is inputted to the recording/reading processing unit 5 is a signal in which mark intervals of a width which corresponds to the marks formed upon the optical disk 10, and space intervals which are positioned between each pair of mark intervals, are repeated. In FIG. 3A, the marks 8T and 3T are examples of recorded signals which are formed in that order upon the optical disk 10. FIG. 3B is a figure showing the pulse modulated write pulse signal of laser light which the recording/reading processing unit 5 irradiates upon the optical disk 10 when the recording signal shown in FIG. 3A is inputted. The write strategy pulse width prescribes the pulse widths of the top pulse P and of the multi-pulse Q of this write pulse signal.

The recording/reading processing unit 5 sets the pulse widths of the top pulse P and of the multi pulse Q in the write pulse signal shown in FIG. 3B, based upon the pulse widths of the write strategy which has been inputted in the step S3 or in the step S9 from the front end control unit 2. Thereafter, during the processing of the step S4, the recording/reading processing unit 5 irradiates, from the light emitting element (LD) of the pickup head 3, laser light of a write pulse signal which has been modulated based upon these pulse widths which have been set.

The peak level A of the laser light in the write pulse signal shown in FIG. 3B is the optimum recording power which has been acquired by OPC. Furthermore, its bottom level B is the read power when reading data recorded upon the optical disk 10.

Accordingly, even in the case of an optical disk 10 for which an optimum intrinsic pulse width is not stored in the memory 21, since the pulse width of the write strategy is calculated in the step S8 in consideration of the characteristics of this optical disk 10 and also the characteristics of the optical disk device 1, accordingly it is possible to record data on the optical disk 10 in an accurate manner. Moreover, in the case of an optical disk 10 for which the optimum intrinsic pulse width is stored in the memory 21, it is possible to reduce the processing burden upon the device, since recording of data is performed with laser light modulated based upon this intrinsic pulse width which is stored.

Furthermore, it would also be acceptable to provide a structure in which the compensated pulse width X calculated in the step S8 is added into the memory 21, as an intrinsic pulse width, in correspondence with the identification information for the optical disk 10. By doing this, next time, when an optical disk 10 of the same type is loaded, in the step S2 it is decided that this is an optical disk 10 of an already known type. Due to this, it becomes possible to reduce the frequency at which the compensated pulse width X is calculated in the step S8, and accordingly it becomes possible to alleviate the processing burden upon the device by yet a further level.

Finally, in the above described explanation of an embodiment of the present invention, all of the features are shown by way of example, and should not be considered as being limitative of the present invention. The scope of the present invention is not to be defined by any of the features of the embodiment described above, but only by the scope of the appended Claims. Moreover, equivalents to elements in the Claims, and variations within their legitimate and proper scope, are also to be considered as being included within the range of the present invention.

What is claimed is:

1. An optical disk device, comprising:
    a strategy storage means which stores, for each value of identification information which indicates a type of multisession type optical disk, an intrinsic write strategy pulse width in relationship therewith;
    a read out means which reads out, from a multisession type optical disk which has been loaded, identification information which indicates its type, and a recommended write strategy pulse width;
    a decision means which decides whether the multisession type optical disk whose identification information has been read out by said read out means is a multisession type optical disk of an already known type whose identification information is stored in said strategy storage means, or is a multisession type optical disk of an unknown type whose identification information is not thus stored;
    a calculation means which, when said decision means has decided that said multisession type optical disk is of an unknown type, calculates a compensated pulse width based upon the value of the difference between the average value of said intrinsic write strategy pulse widths which are stored by said strategy storage means in correspondence with said identification information, and said recommended write strategy pulse width which has been read out by said read out means; and
    a recording means which, in the case of a multisession type optical disk which has been decided by said decision means to be of an already known type, performs recording of data upon said multisession type optical disk with laser light which has been modulated to said intrinsic pulse width stored by said strategy storage means; and conversely, in the case of a multisession type optical disk which has been decided by said decision means to be of an unknown type, performs recording of data upon said multisession type optical disk with laser light which has been modulated to said compensated pulse width calculated by said calculation means.

2. An optical disk device as described in claim 1, wherein said calculation means is a means which calculates said compensated pulse width as being the sum of said average value and said difference value.

3. An optical disk device as described in claim 1, further comprising a control means which, in the case of a multisession type optical disk which has been decided by said decision means to be of an unknown type, takes said compensated pulse width which has been calculated by said calculation means as being an intrinsic pulse width, and stores it in said strategy storage means in correspondence with the identification information for this multisession type optical disk which has been read out by said read out means.

* * * * *